United States Patent [19]

Reinbold

[11] Patent Number: 5,242,307
[45] Date of Patent: Sep. 7, 1993

[54] TEACHING TANK

[76] Inventor: Paul J. Reinbold, 9 Cannongate Dr., Nashua, N.H. 03063

[21] Appl. No.: 912,243

[22] Filed: Jul. 13, 1992

[51] Int. Cl.⁵ .................. G09B 23/24; G09B 25/00
[52] U.S. Cl. ................................... 434/298; 434/370
[58] Field of Search .............. 434/298, 370, 126; 40/406

[56] References Cited

U.S. PATENT DOCUMENTS

| | | | |
|---|---|---|---|
| 2,621,430 | 12/1952 | Neville | 40/406 X |
| 3,348,921 | 10/1967 | Katz et al. | 434/298 X |
| 3,541,705 | 11/1970 | Nelson | 434/126 |
| 4,034,493 | 7/1977 | Ball | 40/406 |
| 4,756,692 | 7/1988 | Pranger | 434/245 |

FOREIGN PATENT DOCUMENTS

| | | | |
|---|---|---|---|
| 46108 | 3/1966 | German Democratic Rep. | 434/298 |
| 48731 | 6/1966 | German Democratic Rep. | 434/298 |

OTHER PUBLICATIONS

The Glass Pneumatic Trough May 1954.

*Primary Examiner*—Robert P. Swiatek
*Assistant Examiner*—Cindy A. Cherichetti
*Attorney, Agent, or Firm*—George W. Dishong

[57] ABSTRACT

A teaching apparatus or teaching tank which has two, a front and a rear, substantially planar walls at least one of which is transparent. A plurality of bolts and spacers, or molded fasteners are used for holding the front and rear walls in parallel opposed spaced relationship to form the tank volume which tank volume is defined by the planar dimensions of the front and rear walls and the tank cavity width which width is determined by the spacers. The tank side walls and bottom are formed using flexible and deformable tubing, such as PVC tubing which is sealingly compressed by the front and rear walls when they are assembled and defines in combination with the planar walls, at least one working cavity having a working cavity volume. The volume and/or volumes is/are variable and a function of the placement of and the dimensions, the length and the OD, of the tubing and the area of the planar walls. The tubing may also be compressed by the weight and resultant pressure on the tubing from any fluid materials, including liquids, which may be introduced into the working cavity or cavities to further provide for a seal. There is also provided various devices, such as stands, fastening means, means for changing the degree of transparency of the planar walls toward opacity all of which are provided in order to better facilitate the use and enhance the usefulness of the teaching tank. There is also a kit of components including the front and rear walls made preferably of rigid transparent plastic material, a supply of flexible plastic or rubber or synthetic tubing having a predetermined OD or having different OD's to be made into selected lengths and to be used to create the tank cavities, bolts or other fasteners and spacers for holding the front and rear walls in parallel opposed and predetermined spaced relationship to form the tank volume, tank support stand, and an instruction book including experiments that are performable using the teaching tank and experimental components and materials which may be included with the kit. The tank is simple, low cost, convenient to use, excellent visual clarity and distant observation, low volume and has versatility as to types of experiments which can be performed with excellent group observation potential. The very use of the teaching tank creates an educational advantage for the teacher and the student in that teachers are afforded a more exciting and visual way to demonstrate a principle of science and the student observers are provided with the opportunity to observe demonstrations and to safely perform experiments wherein the phenomena taking place is more accurately observed or observable and thus perhaps better understood.

18 Claims, 3 Drawing Sheets

TEACHING TANK

BACKGROUND OF THE INVENTION

1. Field of the Invention

This invention most generally relates to teaching apparatus. More particularly, the invention is directed to a tank which has two, a front and a rear, substantially planar walls at least one of which is transparent a means for holding the front and rear walls in parallel opposed spaced relationship to form the tank cavity and tank volume defined by the planar dimensions of the front and rear walls and the tank cavity width. Along with the front and rear walls there is a means for sealably defining in combination with the planar walls, at least one working cavity having a working cavity volume. Such means for defining the working cavity is deformable and creates when assembled with the two planar walls, the teaching tank. The means for sealably defining the working cavity forms side walls and bottom walls all of which may or may not be transparent. The volume and/or volumes is/are variable and a function of the placement of and the dimensions of the means for sealably defining the tank cavities. Even more particularly, the means for defining the working cavity may be flexible tubing which is sealingly compressed by the weight and resultant pressure on the tubing from any fluid materials, including liquids, which may be introduced into the working cavity or cavities. The length and the diameter of the tubing effectively determines the volume of the working cavity for a given planar wall dimension. There is also provided various devices, such as stands, fastening means, means for changing the degree of transparency of the planar walls toward opacity all of which are provided in order to better facilitate the use and enhance the usefulness of the teaching tank. The invention is also particularly directed to a kit of components including the front and rear walls made preferably of rigid transparent plastic material, a supply of flexible plastic or rubber or synthetic tubing having different outside diameters (OD's) to be made into selected lengths and to be used to create the working cavities, means for holding the front and rear walls in parallel opposed and predetermined spaced relationship to form the tank volume with the width dimension being about equal to or less than the tubing OD, tank support means or stand, an instruction book including experiments that are performable using the teaching tank and experimental components and materials.

2. Description of the Prior Art

Teachers have always been looking for better ways to enhance their science lessons and to make science come alive in their classroom. They would love to find easier ways for students to learn the concepts and processes of science.

In the past, students were asked to view, as well as, perform various experiments in small test tubes or beakers. Students were very limited to what they could actually observe because of the inherent small size of the apparatus being used. To increase the size would require the use of considerably more materials and the risks associated with some of the experiments because of the character of the materials and chemicals would also be increased. Take for example, a beaker that holds 600 ml (milliliters) of a liquid and having a diameter of approximately 11 cm (centimeters) and a height of about 14 cm. If a reaction took place in the middle of the beaker you may not observe what is actually taking place because of the thickness of the liquid from the center to the edge of the glass and the curvature of the container.

Teachers still have a very difficult time trying to perform a classroom demonstration, for all students to view at the same time using test tubes, flasks or beakers because of the small size of those which may be used with reasonable economy. The curvature of the material, the glass and the container's shape often creates visual distortion. What students think they observed did not, in many instances in fact take place.

There is a serious need for a teaching device/apparatus or tank which has low volume (to reduce material usage for the experiment) but a large surface area to permit observation by a number of people and from a reasonable distance. The tank should have a surface configuration which reduces or substantially eliminates the distortion of the light passing through the material from which the container or vessel is made, have a working cavity geometry such that the majority of the volume of material or fluid contained within the working cavity is close to the surface of the material through which observation takes place. It would be a further advantage to have a working cavity in which the volume and the perimeter shape may be changed thereby permitting a plurality of cavities within the vessel enhancing the observation results of experiments in which comparative studies and observations may be or need to be made. The teaching tank should be easy to assemble and disassemble and to thoroughly clean for reuse. The present invention satisfies all of the above needs-simple, low cost, convenient to use, excellent visual clarity and distant observation, low volume and versatility as to types of experiments which can be performed with excellent group observation potential. The very use of the teaching tank creates an educational advantage for the teacher and the student in that teachers are afforded a more exciting and visual way to demonstrate a principle of science and the student observers are provided with the opportunity to observe demonstrations and to safely perform experiments wherein the phenomena taking place is more accurately observed or observable and thus perhaps better understood.

After reviewing patents which were developed in a search, no structure or method for teaching fundamental scientific facts similar to the present invention was found nor was one suggested. None of the prior art know to the inventor hereof satisfies the need to, in a convenient, safe, low-cost, and highly visual manner, to effectively teach by demonstration and by experiments that usually involve the use of liquids and/or other forms of flowable materials many scientific principles especially those involving chemical reactions.

Kees, U.S. Pat. No. 4,968,258, shows a reusable learning device consisting of two superimposed planar surfaces. One of the planar surfaces is made of a transparent material that permits a clear view of a work sheet placed between the two surfaces. Kees makes no mention of the suitability of this device for chemical reactions involving liquids.

Zandler, U.S. Pat. No. Des. D233,238, shows an ornamented chemical demostration apparatus. The apparatus is a box-like structure made from a transparent material that appears to permit a view of any object inserted therein from both the first and second brodad, rectangular sides. The internal configuration of the device is fixed in size and geometry.

Bellis, U.S. Pat. No. Des. 2,611,201, shows a display apparatus and includes superimposed, transparent sheets for viewing the structural relationship between the components of a machine. Sheets of material bearing representations of different parts of the structure are related. Representations on the bottom sheet may be blanked out by inserting an opaque sheet between between the two transparent materials. This device is not intended as a receptacle for fluids.

The U.S. Pat. Nos. 4,746,009 to Liberman and 4,993,953 to Stein are simply further representitive of the state of the art.

SUMMARY OF THE INVENTION

The present invention in it's most simple form or embodiment is directed to a teaching tank or tank which permits the carrying out of scientific experiment and permits the easy viewing or observation of the experiment by observers without undue limitations placed on the viewing because of distortions resulting from the shape of the vessel in which the experiment is being carried out or because of the limitation of small viewing area through which observation takes place. The tank is simple, low cost, convenient to use and to clean after use. It provides for excellent visual clarity and distant observation, has low volume and has versatility as to types of experiments which can be performed with excellent group observation potential. The very use of the teaching tank creates an educational advantage for the teacher and the student in that teachers are afforded a more exciting and visual way to demonstrate a principle of science and the student observers are provided with the opportunity to observe demonstrations and to safely perform experiments wherein the phenomena taking place is more accurately observed or observable and thus perhaps better understood. Typically, the ratio of the viewing area (considering one planar viewing side only) to the cavity width is in the order of 650:1 but clearly depends upon the dimensions of the planar walls and basically the outside diameter (OD) of the clear PVC tubing that is preferred for use. Where the planar walls are rectangular (square 12"×12") and the tubing has an OD of 7/32" the ratio is about 658.3:1. The objective being of course to have a large viewing area with a minimal volume and with a reduced width of the cavity, the fluids contained therein can be observed with less loss of light through the fluid thickness and also with less consequent distortion. The fluid within the working cavity or cavities is, relatively speaking, laminar that is the cross section to surface area is very small.

A particular object of the invention is to provide a teaching tank device comprising: a preferably mirror-imaged front and a rear planar wall each having an inside planar surface and each made from material which is substantially rigid and at least one of which, but preferably both of which are transparent. A means is provided, typically a molded form of screwable or otherwise rapid attaching fastener, for assembling and retaining the front and rear planar walls in parallel opposed face-to-face spaced relationship. Each of the inside planar surfaces of the assembled front and rear planar walls define a tank cavity having a tank volume. The tank is defined by a peripheral dimension of at least one of the front and rear planar walls and a tank cavity width. The tank cavity width is substantially equal to the parallel opposed face-to-face spaced relationship and is determined by the screwable fastener dimensions.

A means for sealably forming side walls and bottom walls, preferably clear/transparent PVC tubing having a predetermined tubing length and tubing outside diameter (OD), is also provided which, in combination with the assembled front and rear planar walls, defines at least one working cavity and a resulting working cavity volume. The means for sealably forming side walls and bottom walls is lengthwise flexible and cross-sectionally deformable. The working cavity or cavities is so adapted to contain fluids, liquids and otherwise flowable materials as flowable contents of the at least one working cavity. The fastener means for assembling and retaining the planar walls in parallel opposed face-to-face spaced relationship, may comprise a plurality of screwable fasteners which when used with the front and rear planar walls permits the walls to be easily and quickly assembled and disassembled. Each of the plurality of screwable fastening means comprises a first member having a body portion, a body portion length, a first head end and female threads within and axial to the body portion; a second member having a second member head portion, a body portion and a body portion length with male threads thereon. The male threads are mateable with the female threads. There is also a plurality of assembly holes in each front and rear planar wall. Each assembly hole is sized to accept therethrough to the head end, one of the first and second member body portions. The assembly holes in the front planar wall are located in alignment with the assembly holes in the rear planar wall. The front and rear planar walls so assembled with the plurality of screwable fastening means, the made and female threads matingly joined, create thereby the tank cavity width.

A more particular object of the present invention is to provide a means for supporting the teaching tank in an upright attitude, for effective and easy observation of experiments which may be performed within the working cavities of the assembled teaching tank.

A still more particular object of the present invention is to provide a means for sealably forming side walls and bottom walls which is transparent flexible and apertured tubing having a predetermined tubing length and tubing outside diameter (OD) and an inside diameter (ID). There is a plurality of apertures through a cavity-facing portion of a tubing wall having a wall thickness defined by the difference of the OD and the ID. Each of the apertures has an opening into the at least one working cavity which tubing is sealingly compressed when configured between the assembled planar walls. The tubing length and tubing OD effectively determines by the configuration of the tubing within the tank cavity, each of the working cavity volumes for the predetermined peripheral dimensions of the planar walls.

A primary object of the present invention is to provide a kit of components for use in demonstrating principles of science using the teaching tank device defined above. The kit when assembled comprises: mirror-imaged front and rear planar walls each made of rigid transparent plastic material; a plurality of fasteners used for assembling and retaining the front and rear planar walls in parallel opposed face-to-face spaced relationship. Each inside planar surface of the assembled front and rear planar walls defines a tank cavity having a tank volume. The tank volume is defined by a predetermined peripheral dimension of at least one of the front and rear planar walls and a tank cavity width. The tank cavity width is substantially equal to the parallel opposed face-to-face spaced relationship. There is also provided flexible tubing for sealably forming side walls and bottom salls. The tubing has a predetermined tubing length and tubing outside diameter (OD) which tubing is sealingly compressed, when configured and assembled between the assembled planar walls and effectively determines, by the configuration of the tubing between the planar walls, the tubing length and tubing OD, each of the working cavity volume for the predetermined peripheral dimensions. There is also a means for supporting the tank in an upright attitude, for observation of experiments which may be performed within the working cavity of the said assembled teaching tank. Additionally there may be an instruction book including experiments that are performable using the teaching tank and selected experimental components and materials useful in carrying out selected experiments included in the instruction book.

Another primary object of the present invention is to provide the kit of components with transparent flexible tubing having a predetermined tubing length and tubing outside diameter (OD) and an inside diameter (ID) and having a plurality of apertures through a cavity-facing portion of a tubing wall, the wall thickness defined by the difference of the OD and the tubing ID. Each of the apertures has an opening into the at least one working cavity. The tubing is sealingly compressed when configured between the assembled planar walls and again determines working cavity volume for the predetermined peripheral dimensions.

Yet another primary object of the present invention is to provide the kit of components wherein each of the plurality of fasteners is a fastener as described above and wherein the distance between the first and second component head portion, when the two components are attached is less than the tubing OD plus two time the thickness of one of the planar walls.

Yet still another primary object of the present invention is to provide the kit of components with a plurality of at least one additional sized or second size fasteners which may be used with a second sized tubing OD and which second sized tubing OD cooperates with the second size fasteners to form a second tank cavity width.

These and further objects of the present invention will become apparent to those skilled in the art to which this invention pertains and after a study of the present disclosure of the invention.

DESCRIPTION OF THE PREFERRED EMBODIMENTS

Figure 1A:
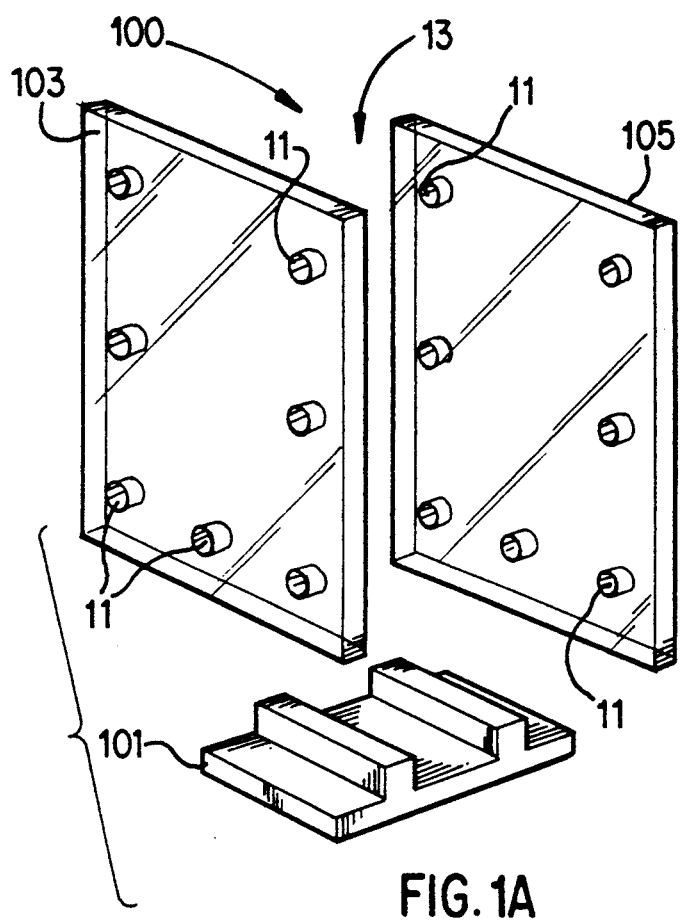
FIGS. 1A, 1B, 1C, 1D, 1E and 1F collectively provide a perspective and schematic illustration of the kit of components including planar walls, fasteners of three types, coils of tubing and a stand.
Figure 1B:
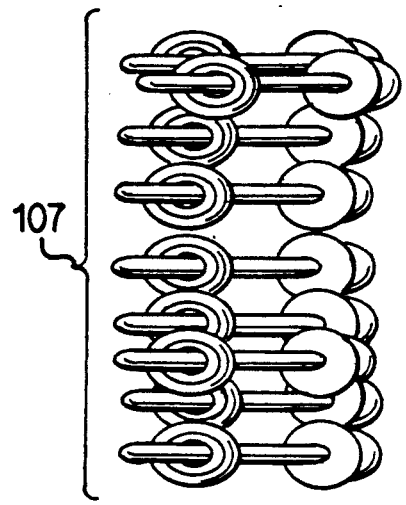
Figure 1C:
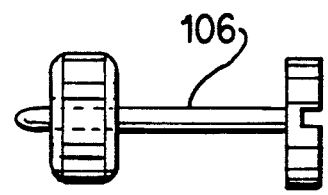
Figure 1E:
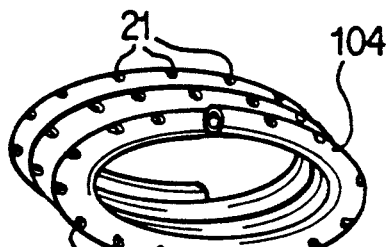
Figure 1D:
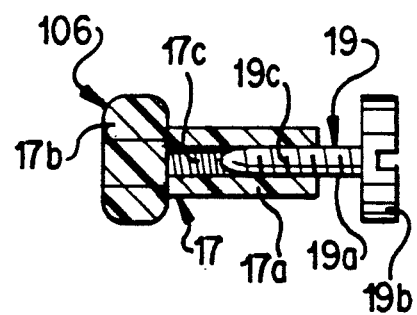
Figure 1F:
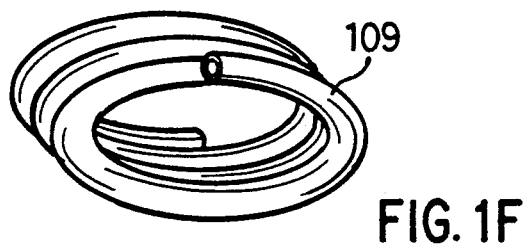

The following is a description of the preferred embodiment of the invention. It is clear that there may be many variations in the size and the shape of the teaching tank 10 except that the ratio of the viewing area (at least the front planar wall 12) through which the contents of the tank 10 may be observed, to the area of the sides 16a and bottom 16b the working cavity 15 shall be substantially greater than one (1). The peripheral geometry 12b or 14b of the front and rear planar walls 12 and 14 of the tank 10 need not be rectangular as is illustrated in the drawing figures but may have any reasonable geometry that may have or may not have any functional utility. The only reason for illustrating the planar walls 12 and 14 with rectangular peripheries is the ease with such a geometry may be fabricated: Additionally, both front and rear planar wall 103 and 105 or 12 and 14 need not have the same peripheral geometry and they both need not be transparent. There may be some demonstrations which would require that the rear wall 15 or 14 be opaque. It is only necessary that they be assembleable "face-to-face" with a space between the facing surfaces 12a and 14a which is equal to or less than the OD dimension of the means 16 used to create the side wall 16a and the bottom 16b of the working cavity 15 within the tank cavity 13, such as flexible tubing 16 or 20 (104 or 109 of the kit 100).

Figure 2A:
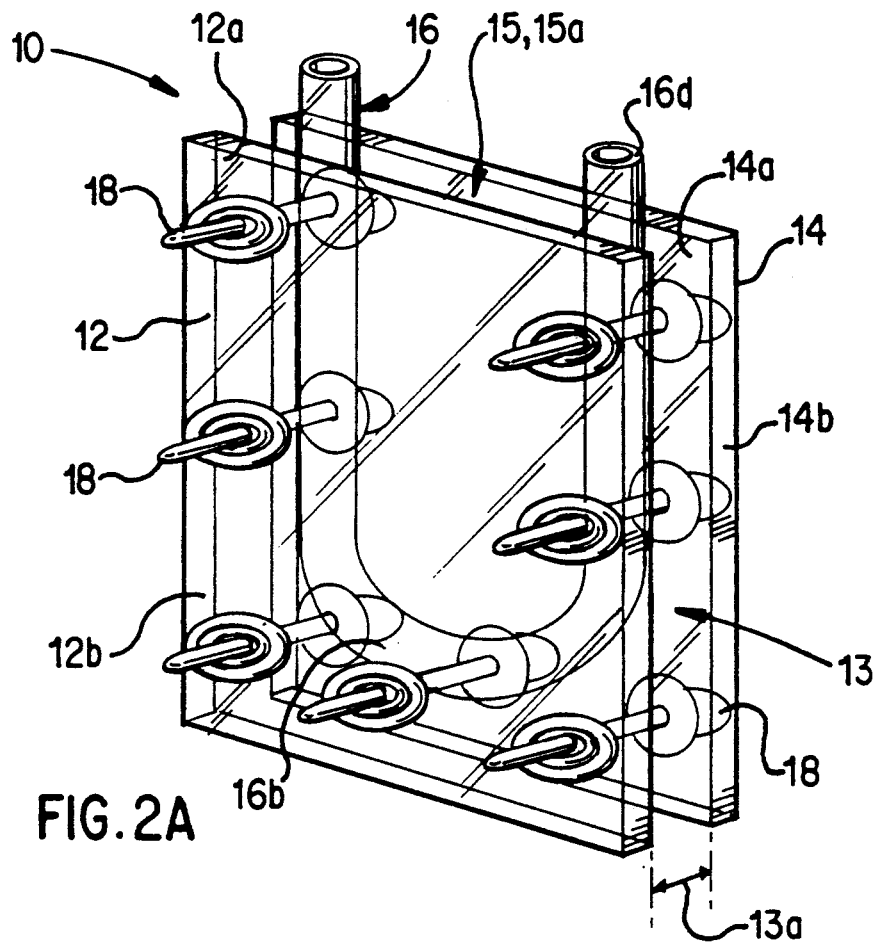
FIG. 2A is a pictorial perspective view of the teaching tank the planar walls assembled and the tubing formed to create one working cavity.
Figure 2B:
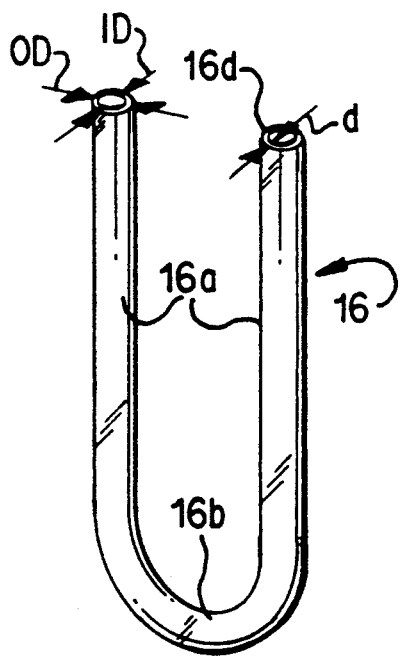
FIGS. 2B and 2C each is a pictorial perspective view of tubing sections one with apertures and one without apertures and each shaped for use between the planar walls of the teaching tank.
Figure 2C:
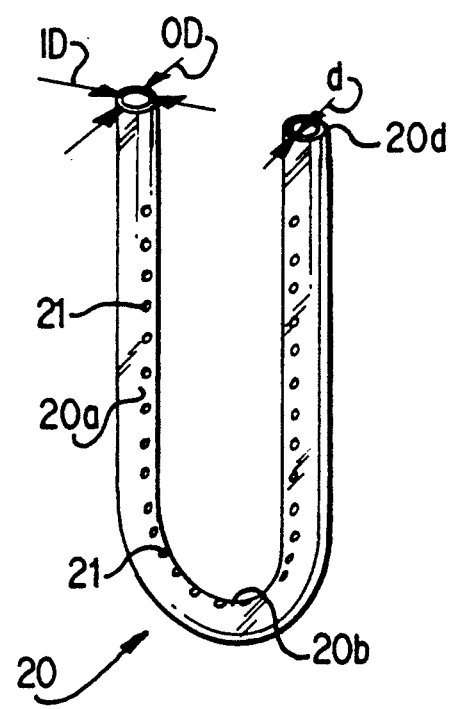
Figure 3:
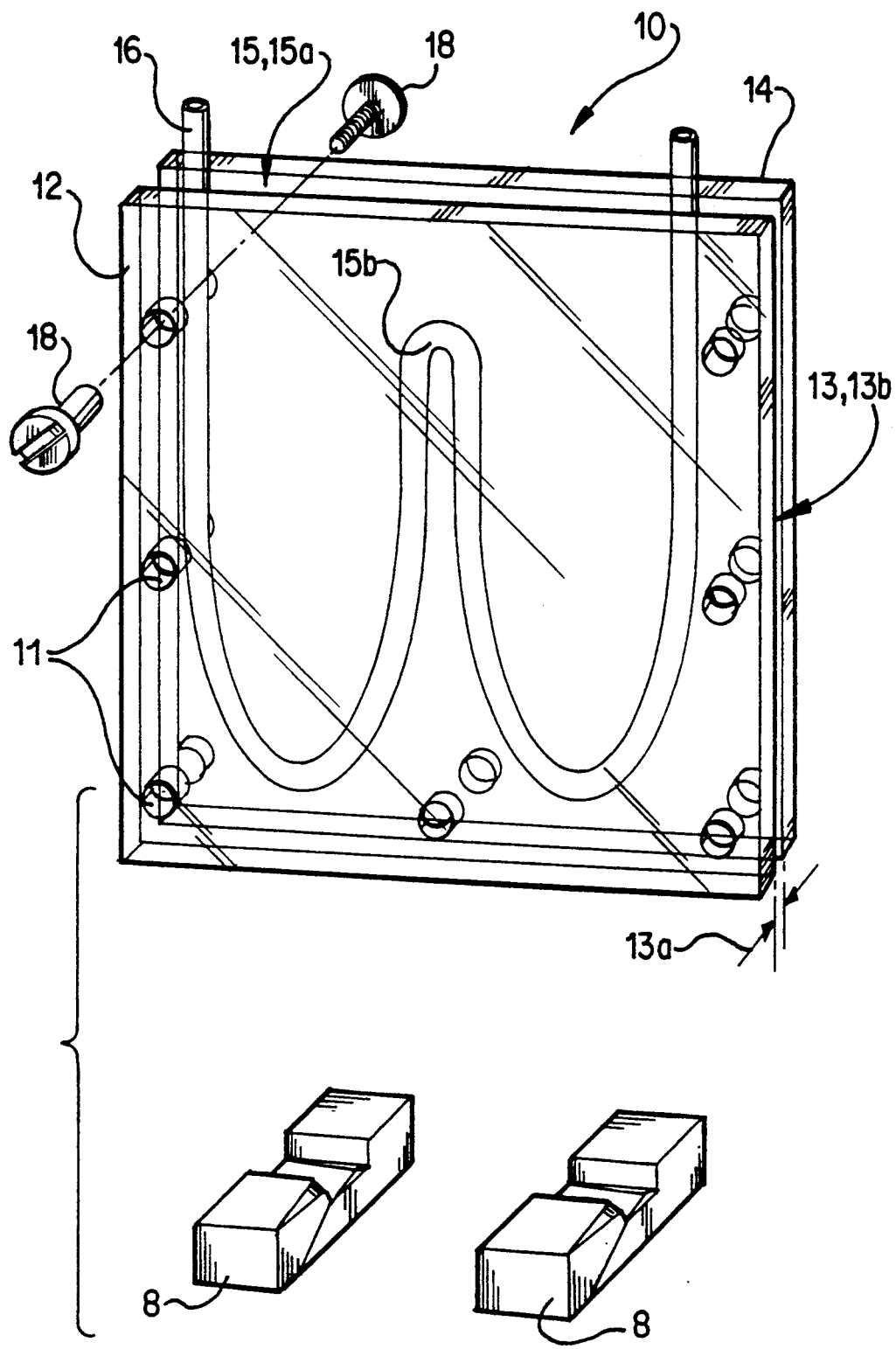
FIG. 3 illustrates another embodiment of the tank wherein the tank has two working cavities formed by the flexible tubing.

Reference is now made to FIGS. 1-3 wherein the kit of components 100 and the teaching tank 10 are pictorially illustrated in relatively simple drawing form. Clearly sizes of the components and shapes of components may vary depending upon the needs of the person using the tank 10 and upon the size of the group who will be observing the experiments and the demonstrations being performed. A stand 101 as a component of kit 100 may have variations such as the stand 8 illustrated pictorially in FIG. 3. The fastener geometry may be as shown in FIGS. 1 and 2 as components 106, 107 or generally as 18 in FIG. 3. Clearly, any fastener which is appropriate in size and strength and shape is acceptable. Preferred however, would be a molded fastener as is shown pictorially in FIG. 1.

Kit 100 of components for the teaching tank consists of at least two planar walls which are preferrably mirror images of each other 103 and 105. Walls 103 and 105 are held in a face-to-face relationship using a number of the plurality of fasteners 107. Between walls 103 and 105 is placed a length of tubing cut from tubing coil 109 or from 104 if apertured tubing is to be used. The length of the tubing is sufficient to form at least one working cavity 15 within the tank cavity 13. Tank cavity 13 has a volume determined by the dimensions of fasteners 107 and the outside diameter (OD) of tubing in coil 109 or 104. Working cavity volume 15a is directly related to the length of tubing and the OD of the tubing. Obviously, by undulating the tubing within tank cavity 13 and tank cavity volume 13b more than one working cavity may be created. When planar walls 103 and 105 are tightened against the OD and the tubing walls 16d or 20d a tight seal is formed keeping the tubing in place and preventing leakage of any fluid placed within working cavity or cavities 15.

An instruction book along with materials for conducting various experiments may be included in the kit 100. Materials which are included will depend upon the type of use kit 100 will have.

FIGS. 2 and 3 illustrate teaching tank 10 in a substantially assembled configuration. In FIG. 2 means 16 for forming walls 16a and 16b is shown as flexible and transparent tubing configured in a "U" shape. The "U" shape, in this instance being the shape or periphery 15b, of working cavity 15. The length of the tubing 16 or 20 and the OD defines at least one working volume 15a. Fasteners are generically illustrated by element 18 and are placed into each of assembly holes 11 of the planar walls 12 and 14. FIG. 3 clearly infers the variability of the tank 10 as to the shape and sizes possible for working cavities 15. Stand 8 is illustrated simply as two blocks having a slot with a width about equal to the tank cavity width 13a plus twice the thickness of the material from which the mirror-imaged planar walls is made. Certainly more complex and elaborate stands may be made for the purpose of keeping tank 10 in a position for viewing by those observing experiments.

The means for sealably forming side walls 20a and bottom walls 20b may also be transparent flexible and apertured tubing 20 having a predetermined tubing length and tubing outside diameter (OD) and an inside diameter (ID). There is a plurality of apertures 21 through a working cavity-facing portion of a tubing wall 20d having a wall thickness "d" defined by the difference of the OD and the ID. Each of the apertures 21 has an opening into at least one working cavity 15 which tubing 20 is sealingly compressed when configured between the assembled planar walls 12 and 14. The tubing length and tubing OD effectively determines by the configuration of the tubing 20 within the tank cavity 13, each of the working cavity volumes 15 for the predetermined peripheral dimensions of the planar walls 12 and 14. Using such apertured tubing 20, gas or other fluids may be controllably introduced into the working cavities 15 and into any fluid or liquid placed therein. Additionally, by creating a vacuum rather than a positive or neutral pressure within the apertured tubing 20, controlled amounts of fluid may be drawn out of the working cavity 15 and drawn out at specific locations by preselecting an aperture or apertures 21 to be used.

Because vacuum systems and pumps of various types are well known in the field of scientific experiments and demonstrations, such detail has not been shown in the drawings or discussed herein.

Teaching tank 10 may be quickly assembled disassembled cleaned and reused. Tank 10 is itself relatively inexpensive and uses limited amounts of materials because of the substantially laminar shape of the fluid or fluids contained within the working cavity 15. Despite the fact of low volume of materials used, the ability for a large number of observers to clearly observe the progress of experiments, is greatly improved because of the large viewing area relative to the cavity volume.

FIG. 1 shows a cross section of fastener 106. Fastener 106, in this instance may be a molded fastener having a first member 17 which has a body portion 17a, a head portion 17b and female threads 17c on the inside surface of body portion 17a. A molded second member 19 has a body portion 19a, head portion 19b and male threads 19c on body portion 17a. Head portions 17b and 17b are sufficiently large so that they will not fit through assembly holes 11 of planar walls 103 and 105. However, body portions 17b and 19b fit through assembly holes 11. Walls 103 and 105 are held in face-to-face relationship by fasteners such as 106 by inserting first members 17 into assembly holes 11 in one of the walls and second members 19 into assembly holes 11 in the other of the walls and engaging male threads 19c of second member body portion 19a with female threads 17c of first member body portion 17a until the body portions are fully engaged. The spacing between heads 17b and 19b of assembled fastener 106 is less than or equal to the sum of the tubing OD and the thicknesses of planar walls 103 and 105. The compression of tubing 16 or 20 is thereby limited.

It is thought that the teaching tank device and the kit thereof of the present invention and many of its attendant advantages is understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A teaching tank device comprising:

a front and a rear planar wall each having an inside planar surface and each made from material which is substantially rigid and at least one of which planar walls is transparent;

means for assembling and retaining said front and rear planar walls in parallel opposed face-to-face spaced relationship, each said inside planar surface of said assembled front and rear planar walls defining a tank cavity having a tank volume defined by a predetermined peripheral dimension of at least one of said front and rear planar walls and a tank cavity width, said tank cavity width being substantially equal to said parallel opposed face-to-face spaced relationship; and means for sealably forming side walls and bottom walls, said side and bottom walls in combination with said assembled front and rear planar walls defining at least one working cavity each having a working cavity volume, said means for sealably forming side walls and bottom walls being lengthwise flexible and cross-sectionally deformable creating, when assembled and sealably configured between said assembled planar walls, said at least one working cavity adapted to contain fluids, liquids and otherwise flowable materials as flowable contents.

2. The teaching tank device according to claim 1 wherein said means for sealably forming side walls and bottom walls is flexible tubing having a predetermined tubing length and tubing outside diameter (OD) which tubing is sealingly compressed, when configured and assembled between said assembled planar walls, effectively determining by said configuration, tubing length and tubing OD, each said working cavity volume.

3. The teaching tank device according to claim 1 wherein said tubing is transparent and both said front and rear planar walls have substantially equal peripheral geometry and dimensions and are transparent.

4. The teaching tank device according to claim 3 wherein said means for assembling and retaining said front and rear planar walls in parallel opposed face-to-face spaced relationship, comprises a plurality of screwable fastening means which when used with said front and rear planar walls permits said walls to be easily and quickly assembled and disassembled.

5. The teaching tank device according to claim 4 wherein each said plurality of screwable fastening means comprises a first member having a body portion, a body portion length, a first head end and female threads within and axial to said body portion; a second member having a second member head portion, a body portion and a body portion length with male threads thereon, said male threads mateable with said female threads; and a plurality of assembly holes in each front and rear planar wall sized to accept therethrough to said head end, one of said first and second member body portions and each said assembly holes in said front planar wall being in alignment with an assembly hole in said rear planar wall, said front and rear planar walls so assembled with said plurality of screwable fastening means, said male and female threads matingly joined, creating thereby said tank cavity width.

6. The teaching tank device according to claim 5 further comprising means for supporting in an upright attitude, for observation of said assembled teaching tank.

7. The teaching tank device according to claim 1 wherein said means for sealably forming side walls and bottom walls is transparent flexible apertured tubing having a predetermined apertured tubing length and tubing outside diameter (OD) and an inside diameter (ID) with a plurality of apertures through a cavity-facing portion of a wall of said apertured tubing, said wall having a wall thickness defined by the difference of said OD and said ID, each said aperture having an opening into said at least one working cavity which apertured tubing is sealingly compressed when configured between said assembled planar walls, effectively determining by said configuration, said apertured tubing length and tubing OD, each said working cavity volume.

8. The teaching tank device according to claim 7 wherein said front and rear planar walls have substantially equal peripheral geometry and dimensions and are transparent.

9. The teaching tank device according to claim 8 wherein said means for assembling and retaining said front and rear planar walls in parallel opposed face-to-face spaced relationship, comprises a plurality of screwable fastening means which when used with said front and rear planar walls permits said walls to be easily and quickly assembled and disassembled.

10. The teaching tank device according to claim 9 wherein each said plurality of screwable fastening means comprises a first member having a body portion, a body portion length, a first head end and female threads within and axial to said body portion; a second member having a second member head portion, a body portion and a body portion length with male threads thereon, said male threads mateable with said female threads; and a plurality of assembly holes in each front and rear planar wall sized to accept therethrough to said head end, one of said first and second member body portions and each said assembly holes in said front planar wall being in alignment with an assembly hole in said rear planar wall, said front and rear planar walls so assembled with said plurality of screwable fastening means, said male and female threads matingly joined, creating thereby said tank cavity width.

11. The teaching tank device according to claim 10 further comprising means for supporting in an upright attitude, for observation of said assembled teaching tank.

12. A kit for use in demonstrating principles of science using a teaching tank device adapted to contain fluids, liquids and otherwise flowable materials as flowable contents of at least one working cavity each of said at least one working cavity having thereby a working volume, said kit when assembled comprising:

mirror-imaged front and rear planar walls each made of rigid transparent plastic material;

a plurality of fasteners used for assembling and retaining said front and rear planar walls in parallel opposed face-to-face spaced relationship, each inside planar surface of said assembled front and rear planar walls defining a tank cavity having a tank volume defined by a predetermined peripheral dimension of at least one of said front and rear planar walls and a tank cavity width, said tank cavity width being substantially equal to said parallel opposed face-to-fce spaced relationship;

flexible tubing for sealably forming side walls and bottom walls having a predetermined tubing length and tubing outside diameter (OD) which tubing is sealingly compressed, when configured and assembled between said assembled planar walls, effectively determining by said configuration tubing length and tubing OD, each said working cavity volume; and means for supporting in an upright attitude, for observation of said assembled teaching tank.

13. The kit for use in demonstrating principles of science using a teaching tank device according to claim 12 further comprising transparent flexible apertured tubing having a predetermined apertured tubing length and apertured tubing outside diameter (OD) and an inside diameter (ID) with a plurality of apertures through a cavity-facing portion of a wall of said apertured tubing, said wall having a wall thickness defined by the difference of said OD and said ID, each said aperture having an opening into said at least one working cavity which apertured tubing is sealingly compressed when configured between said assembled planar walls, effectively determining by said configuration, said apertured tubing length and apertured tubing OD, each said working cavity volume.

14. The kit for use in demonstrating principles of science using a teaching tank device according to claim 13 further comprising instruction book including explanation and instructions for experiments that are performable using said teaching tank; and selected experimental components and materials useful in carrying out selected experiments included in said instruction book.

15. The kit for use in demonstrating principles of science using a teaching tank device according to claim 14 wherein each said plurality of fasteners comprises a first member having a body portion, a body portion length, a first head end and female threads within and axial to said body portion; a second member having a second member head portion, a body portion and a body portion length with male threads thereon, said male threads mateable with said female threads; and a plurality of assembly holes in each front and rear planar wall sized to accept therethrough to said head end, one of said first and second member body portions and each said assembly holes in said front planar wall being in alignment with an assembly hole in said rear planar wall, said front and rear planar walls so assembled with said plurality of screwable fastening means, said male and female threads matingly joined, creating thereby said tank cavity width.

16. The kit for use in demonstrating principles of science using a teaching tank device according to claim 12 further comprising instruction book including explanation and instructions for experiments that are performable using said teaching tank; and selected experimental components and materials useful in carrying out selected experiments included in said instruction book.

17. The kit for use in demonstrating principles of science using a teaching tank device according to claim 16 wherein each said plurality of fasteners comprises a first member having a body portion, a body portion length, a first head end and female threads within and axial to said body portion; a second member having a second member head portion, a body portion and a body portion length with male threads thereon, said male threads mateable with said female threads; and a plurality of assembly holes in each front and rear planar wall sized to accept therethrough to said head end, one of said first and second member body portions and each said assembly holes in said front planar wall being in alignment with an assembly hole in said rear planar wall, said front and rear planar walls so assembled with said plurality of screwable fastening means, said male and female threads matingly joined, creating thereby said tank cavity width.

18. The kit for use in demonstrating principles of science using a teaching tank device according to claim 14 further comprising:

a plurality of at least a second size fasteners used for assembling and retaining said front and rear planar walls in parallel opposed face-to-face spaced relationship, each inside planar surface of said assembled front and rear planar walls defining a second size tank cavity having a second tank volume defined by said predetermined peripheral dimension of at least one of said front and rear planar walls and a second tank cavity width; and a plurality of at least a second size flexible tubing for sealably forming side walls and bottom walls having a predetermined tubing length and tubing second outside diameter (2nd OD) which second size tubing is sealingly compressed, when configured and assembled between said assembled planar walls using said second size fasteners, effectively determining by said configuration second tubing length and tubing 2nd OD, each said working cavity volume.

* * * * *